US006633393B1

(12) United States Patent
Fukano

(10) Patent No.: US 6,633,393 B1
(45) Date of Patent: Oct. 14, 2003

(54) PRINTER, A CONTROL METHOD THEREFOR, AND A CONTROL METHOD STORAGE MEDIUM

(75) Inventor: Kazuko Fukano, Swua (JP)

(73) Assignee: Seiko Epson Coprporation, Tokyo (JP)

(*) Notice: Subject to any disclaimer, the term of this patent is extended or adjusted under 35 U.S.C. 154(b) by 0 days.

(21) Appl. No.: 09/454,898

(22) Filed: Dec. 3, 1999

(30) Foreign Application Priority Data

Dec. 10, 1998 (JP) .......................................... 10-351755
Dec. 15, 1998 (JP) .......................................... 10-356177

(51) Int. Cl.[7] ............................................... G06K 15/00
(52) U.S. Cl. ..................................... 358/1.12; 358/1.13
(58) Field of Search .......................... 358/1.1, 1.5, 1.11, 358/1.12, 1.13, 1.14, 1.15, 1.18, 474, 296, 304; 382/181, 182; 399/16, 18, 22, 361, 371, 374

(56) References Cited

U.S. PATENT DOCUMENTS

| | | | | |
|---|---|---|---|---|
| 4,970,661 A | | 11/1990 | Tsuzuki et al. | |
| 5,004,928 A | | 4/1991 | Suzuki et al. | |
| 5,301,036 A | * | 4/1994 | Barrett et al. | 358/448 |

FOREIGN PATENT DOCUMENTS

| | | |
|---|---|---|
| EP | 0 361 531 | 4/1990 |
| EP | 0 881 085 | 12/1998 |
| JP | 61-215077 | 9/1986 |
| JP | 62-156790 | 7/1987 |
| JP | 2-65559 | 5/1990 |
| JP | 3-63144 | 3/1991 |
| JP | 3-70953 | 7/1991 |
| JP | 7-131630 | 5/1995 |
| JP | 8-39876 | 2/1996 |

* cited by examiner

*Primary Examiner*—Arthur G. Evans

(57) ABSTRACT

A printer is provided which reliably detects front and back sides of a print medium and the print data to be printed to the respective sides, and automatically prints print data to the correct side of the print medium. A print command interpreter 203 interprets a print command received from the host device to determines the print medium side indicated by the print command for printing associated print data. An inserted side detecting means 207 detects which side of the print medium inserted to the printer is facing a particular direction. Control units 204 and 208 print the print data when the print medium side detected by the print command interpreter 203 and the print medium side detected by the inserted side detecting means 207 are the same. Data can thus be printed to a desired specific side of the print medium because the printer 10 can reliably print to the print medium side specified by the host 220.

44 Claims, 19 Drawing Sheets

| Top | Bottom | Form side detection result |
|---|---|---|
| NO | YES | Front |
| YES | NO | Back |

[A :Detector/(star):Detector position/YES:Form detected/NO:Form not detected]

| (A) | (B) | Form side detection result |
|---|---|---|
| NO | YES | Front |
| YES | NO | Back |

[A,B:Detector/(star):Detector position/YES:Form detected/NO:Form not detected]

| (A) | | (B) | | Form side detection result |
|---|---|---|---|---|
| Top | Bottom | Top | Bottom | |
| NO | YES | YES | NO | Front and inserted lengthwise |
| YES | NO | NO | YES | Back and inserted lengthwise |
| YES | NO | YES | YES | Front and inserted widthwise |
| NO | YES | YES | YES | Back and inserted widthwise |

[A,B:Detector/☆(star):Detector position/YES:Form detected/NO:Form not detected]

| (A) | (B) | Form side detection result |
|---|---|---|
| NO | YES | Front and advancing with top edge first |
| YES | NO | Back and advancing with top edge first |
| YES | YES | Advancing with bottom edge first |

[A,B:Detector/(star):Detector position/YES:Form detected/NO:Form not detected]

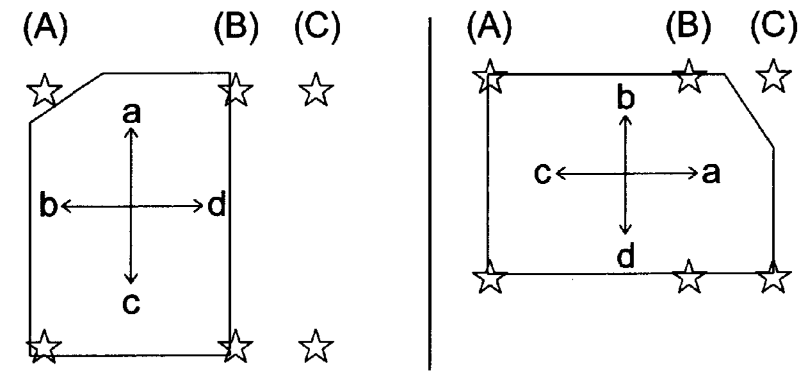

| Top | | | Bottom | | | Form insertion direction |
|---|---|---|---|---|---|---|
| (A) | (B) | (C) | (A) | (B) | (C) | |
| NO | YES | NO | YES | YES | NO | Front and direction a |
| YES | YES | NO | YES | YES | YES | Front and direction b |
| YES | YES | NO | YES | NO | NO | Front and direction c |
| YES | YES | YES | NO | YES | YES | Front and direction d |
| YES | NO | NO | YES | YES | NO | Back and direction a |
| NO | YES | YES | YES | YES | YES | Back and direction b |
| YES | YES | NO | NO | YES | NO | Back and direction c |
| YES | YES | YES | YES | YES | NO | Back and direction d |

[A,B,C:Detector/☆(star):Detector position/YES:Form detected/NO:Form not detected]

FIG.16

PRINTER, A CONTROL METHOD THEREFOR, AND A CONTROL METHOD STORAGE MEDIUM

BACKGROUND OF THE INVENTION

1. Field of the Invention

The present invention relates to a printer having a function for printing to both sides of cut-sheet forms and other print media. The invention further relates to a control method for controlling the printer and to a data medium for having a computer program to implement the control method.

More particularly, the present invention relates to a printer for handling a print medium, such as a personal check, having a predefined format with specific front and back sides to which different information must be appropriately printed. The invention further relates to a control method for controlling the printer and to a data storage medium for storing said control method.

2. Description of the Related Art

Printers for printing to such specifically formatted printing forms as invoices, tickets, and personal or corporate checks are widely available and commonly used. Typical of such printers are point-of-sale (POS) printers for printing sales receipts as well as customer checks received for payment. A typical check processing method used in a POS system is described below.

A basic POS system comprises a host device and a printer connected to this host. The printer comprises a print head for check printing and a MICR (magnetic ink character recognition) head for reading magnetic ink characters preprinted to the check.

The characters and print quality of MICR text conforms to known standards such as E13B or CMC7. MICR text is also printed to a standardized location on the checks. When the MICR head passes over the MICR text, the text is detected and converted to an electrical signal. The waveform of the signal varies with each letter, thereby making it possible to interpret the signal to recognize and read the preprinted MICR text.

Check processing at the POS station includes printing the date, store name, and check amount on the check front, and printing a check endorsement and bank account number for the store on the back. For simplicity below, these operations are hereafter referred to as simply printing the front and back of the check.

FIG. 19 is a flow chart of a check processing method using a conventional printer comprised to read MICR text when the check is inserted for printing the back of the check.

When a store clerk receives a check for payment from a customer, the clerk operates the host to receive payment via check. This causes the host device to start check processing, and send a MICR text reading command to the printer. The printer thus receives and interprets this read command, and waits for a check to be inserted so that the read command can be executed (step S1901).

When the clerk inserts a check to the printer, the printer reads and recognizes the MICR text (step S1902), and sends the result to the host (step S1903). The host then determines whether the check is valid based on the information received from the printer. Check validation in this example can be simply accomplished by comparing the checking account number read from the check with a database of invalid account numbers.

If the check is determined to be valid, the host sends the information for printing for the back of the check to the printer. Note that this information is hereafter referred to as the endorsement information. When the printer receives the endorsement information (step S1904), it advances the check to the printing start position of the print head (step S1905), prints (step S1906), and then ejects the printed check (step S1907).

The clerk then turns the check over and reinserts to the printer. The printer again advances the check to the printing start position (step S1908). When the check is positioned, the host sends the information to be printed on the check front, referred to as the payment information below, to the printer. The printer thus receives the payment information (step S1909), prints (step S1910), and ejects the printed check (step S1911). The clerk then hands the printed check to the customer for verification and signing, and receives the check back from the customer to complete the transaction.

It will thus be obvious that a conventional printer of this type prints to both sides of a check or other standard form by printing data in the sequence received from the host, printing a first set of information to one side of the form, waiting for the operator to reverse and reinsert the form, and then printing a second set of information to the other side of the form.

Conventional printers of the type described above, however, are unable to determine whether the print data received from the host is to be printed to the front or to the back of the form. The printer therefore prints whatever data is received from the host to whichever side of the form is inserted for printing, regardless of whether the form is appropriately positioned for printing to the desired side. This means that if the form is incorrectly inserted and positioned, the printing process still executes. This results in inconvenience for both the operator and customer and unnecessarily wastes blank forms or checks Furthermore, while some printers have the print head and the MICR head positioned on the same side of the form transportation path, other printers have these heads on opposite sides of the form transportation path. The host must therefore change the sequence in which data is sent to the printer based on whether these heads are on the same or opposite sides of the path. That is, the host must be set up or switch to send either the form front information, i.e., the payment information in the above example, or the form back information, i.e., the endorsement information in the above example, first, and this further complicates the printing process.

OBJECTS OF THE INVENTION

Therefore, it is an object of the present invention to overcome the aforementioned problems.

With consideration for the above-described problems, it is therefore an object of the present invention to provide a printer for correctly printing print data to a desired side of a print form.

It is a further object of the present invention to provide a control method for this printer.

It is yet further object of the present invention to provide a medium for having a computer program implementing the control method.

SUMMARY OF THE INVENTION

To achieve the above objects, a printer connected to a host device for printing to a print medium based on print data and a print command received from the host device comprises according to the present invention: a print command interpreter for interpreting print commands from the host device and determining a print medium side indicated by a received print command for printing associated print data; an inserted side detection processor or detecting means for detecting which side of a print medium inserted to the printer is facing a particular direction; and a control unit for printing the print data when the print medium side detected by the print command interpreter and the print medium side detected by the inserted side detecting means are the same.

Printing to the wrong side of a print medium (form) can thus be prevented because printing occurs when the print medium side specified by the host and the side of the print medium inserted for printing are the same.

Further preferably, the control unit causes the inserted print medium to be ejected when the print medium side detected by the print command interpreter and the print medium side detected by the inserted side detecting means are not the same.

In this case the printer further preferably comprises a form insertion opening for inserting a print medium, and a form ejection opening for ejecting a print medium from the printer. Yet further preferably, the control unit causes the inserted print medium to be ejected from the form ejection opening after printing is completed when the print medium side detected by the print command interpreter and the print medium side detected by the inserted side detection processor or detecting means are the same, and causes the inserted print medium to be ejected from the form insertion opening when the print medium side detected by the print command interpreter and the print medium side detected by the inserted side detecting means are not the same.

By thus differently ejecting the print medium, the printer operator can easily determine whether printing was completed normally.

Yet further preferably, a printer according to the present invention additionally comprises a form reversing mechanism for reversing sides of an inserted print medium. When thus comprised, the control unit reverses print medium sides by means of the form reversing mechanism, and then prints the print data to the print medium, when the print medium side detected by the print command interpreter and the print medium side detected by the inserted side detecting means are not the same.

By thus reversing sides of the print medium when the print medium is not inserted to the printer with the side specified for printing by the host correctly oriented for printing, the printer can automatically match the printed side of the medium to the side specified by the host. Desired printing results can therefore be achieved, and printer throughput and productivity can be improved.

Alternatively, a printer according to the present invention comprises a first printing unit for printing print data to one side of a print medium, and a second printing unit for printing print data to the other side of a print medium. In this case the control unit selects the first or second printing unit for printing received print data to the print medium side indicated by the print command based on the print medium side detected by the print command interpreter and the print medium side detected by the inserted side detecting means.

Desirable printing results can thus be reliably achieved even when the print medium is not inserted to the printer with the side specified for printing by the host desirably oriented for printing because the printer selectively drives one of two printing units based on the side indicated by the host device and the orientation of the inserted print medium.

Further alternatively, a printer according to the present invention comprises an inserted form side notification unit or inserted form side notification means for sending to the host device a print medium side notification indicative of the print medium side detected by the inserted side detection processor or detecting means, and a print data receiver or receiving means for receiving from the host device print data corresponding to the detected print medium side. In this case the control unit prints the received print data to the print medium.

By thus requesting print data corresponding to a specific side of the print medium, desired printing results can be achieved even when printing buffer capacity is limited.

Yet further alternatively, a printer according to the present invention comprises a first storage buffer for storing print data for printing to a front side of the print medium, and a second storage buffer for storing print data for printing to a back side of the print medium. The control unit in this case selects data stored to the first or second storage buffer and prints to the print medium based on the print medium side detected by the inserted side detecting means.

Printing errors can thus be prevented and efficiency can be improved because print data is retrieved from a buffer corresponding to a particular side of the print medium. It is therefore possible to repeatedly use the same print data when print data is static. As a result, steps for resending the same print data multiple times can be eliminated.

A printer according to the present invention further preferably comprises an insertion direction detection processor or detecting means for detecting a direction in which a print medium is inserted to the printer, and a print data rotation processor or print data rotation processing means for rotating print data based on the form insertion direction detected by the insertion direction detection processor or detecting means.

When thus comprised, print data can be processed for both the form side inserted for printing and the lengthwise or widthwise orientation of the inserted form.

The inserted side detection processor or detecting means and insertion direction detector or detecting means can respectively detect which side of the print medium is inserted for printing and the lengthwise or widthwise orientation of the inserted form by detecting a specific marking on the print medium. Exemplary markings include magnetic ink characters and bar codes.

It is also possible to use a print medium having one or more specific corners cut off. In this case the inserted side detection processor or detecting means and insertion direction detector or detecting means can respectively function by detecting the specific corner(s).

It will also be obvious that the present invention can be expressed as a method for controlling a printer, and this method can achieve the same advantages and benefits described above. In addition, a control method according to the present invention can be provided as a control program that can be run by a control unit for the printer. This control program can also be provided by way of a medium to which the control program is recorded and stored. Exemplary storage media include: semiconductor memory, CD-ROM, floppy disk, hard disk, magneto-optical disk, DVD-ROM and DVD-RAM disks, and magnetic tape. Such storage media can also be used to introduce a control program according to the present invention to existing printers. This control program can also be made available on an internal computer network or an external computer network, such as a site on the World Wide Web, enabling users to download the program for use with existing printers.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

FIG. 16 is used to describe another exemplary method according to the present invention for detecting which side of a print medium is facing a particular direction and the direction in which the print medium is inserted;

DESCRIPTION OF THE PREFERRED EMBODIMENTS

The preferred embodiments of the present invention are described below with reference to the accompanying figures.

Embodiment 1

Figure 1:
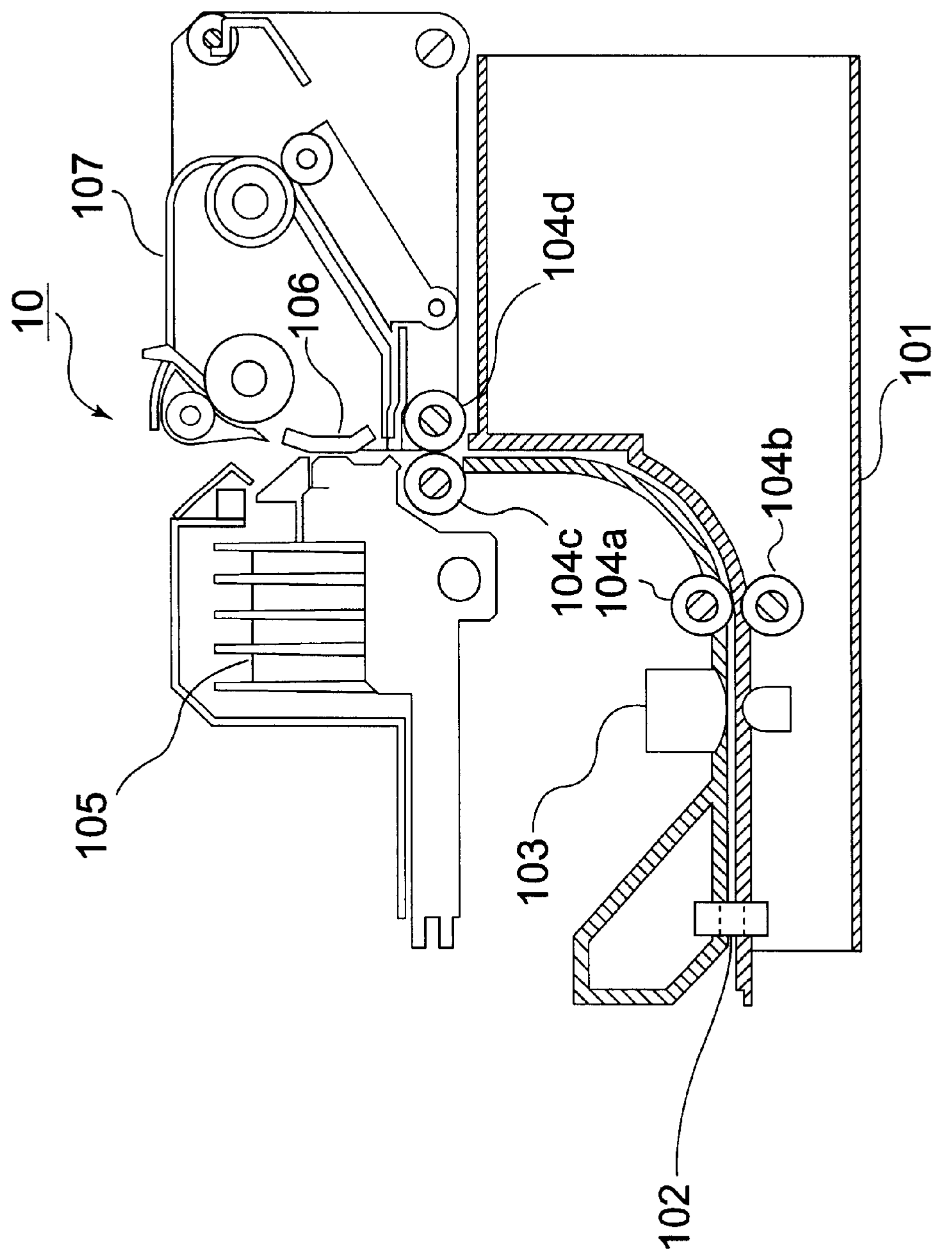
FIG. 1 is a cross-sectional view of a printer according to a first preferred embodiment of the present invention.

FIG. 1 is a cross-sectional view of a printer 10 according to a first preferred embodiment of the present invention. This printer 10 comprises a main housing 101 having a control unit, a form insertion opening 102 from which a cut form or other print medium is inserted, an MICR reader 103, transportation rollers 104*a* to 104*d*, print head 105 for printing print data to the print medium, a platen 106 opposite the print head 105, and a form ejection mechanism 107 for passing the print medium out from the printer. The MICR reader 103 is disposed in proximity to the form insertion opening 102 for reading MICR text preprinted on an inserted print medium.

Figure 2:
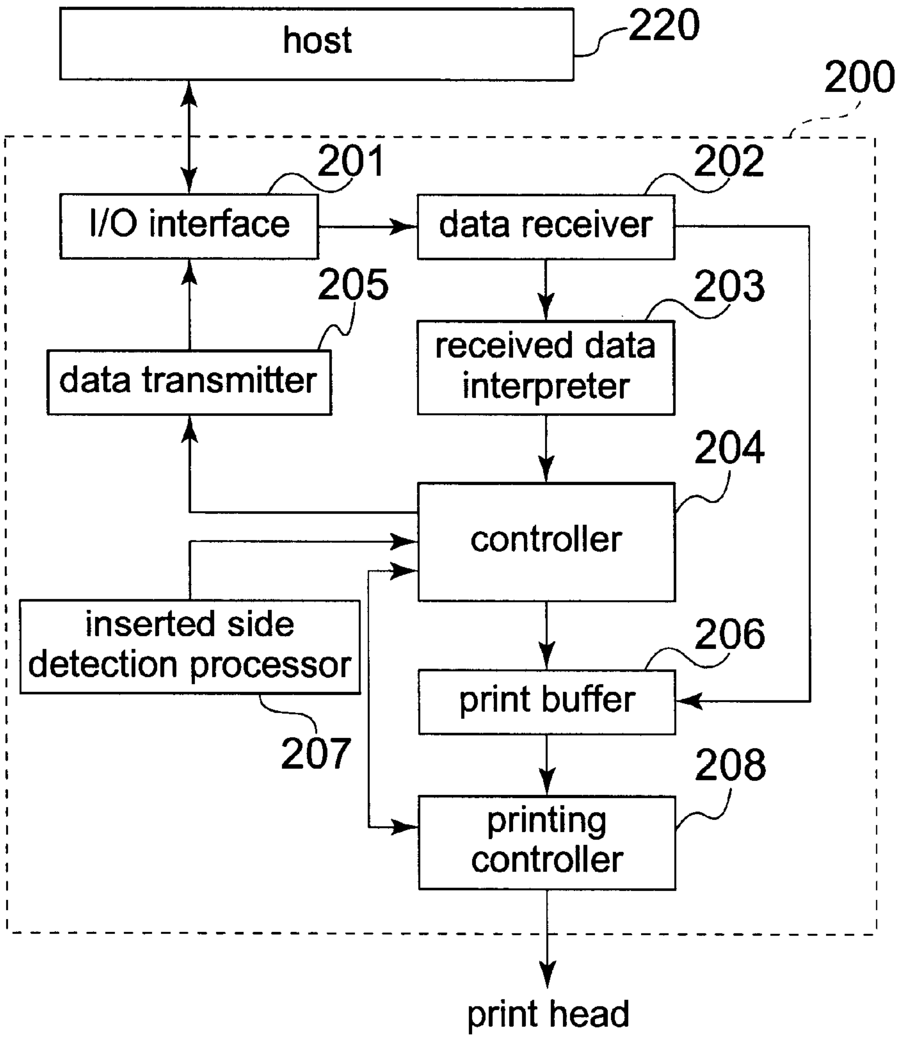
FIG. 2 is a functional block diagram of a control unit in the printer shown in FIG. 1.

FIG. 2 is a functional block diagram of a control unit for a printer according to this first embodiment of the invention. As shown in FIG. 2 this control unit 200 comprises an input/output (I/O) interface 201, a data receiver 202, a received data interpreter 203, an inserted side detection processor 207, a print buffer 206 for temporarily storing print data for a particular form side, a printing controller 208 for printing data stored to the print buffer 206, a data transmitter 205, and a controller 204 for controlling various parts of the printer 10.

Control commands, print data, and other information are passed between the control unit 200 and the host 220 through the I/O interface 201. Control commands, print data, and other information are received through the I/O interface 201 by the data receiver 202, and received data is then interpreted by the received data interpreter 203. The inserted side detection processor 207 determines whether the form has been inserted with the front or back side facing a particular direction. The data transmitter 205 passes the printer processing status to the host 220 via the I/O interface 201.

Figure 3:
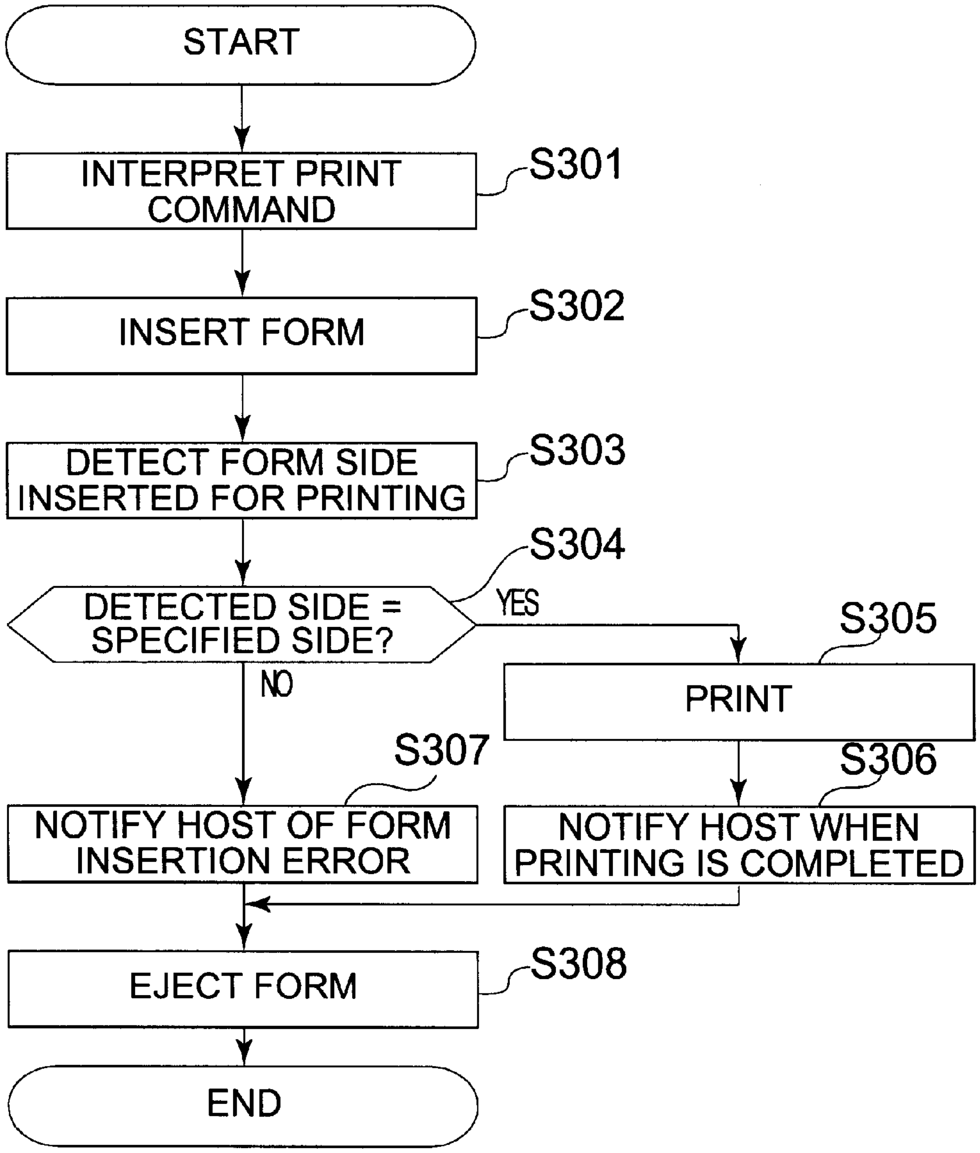
FIG. 3 is a flow chart of a printing process in the printer shown in FIG. 1.

FIG. 3 is a flow chart of a printing process run by a printer according to this first preferred embodiment of the present invention. At the start of this printing process the data receiver 202 of the printer 10 receives and interprets data sent from the host 220 by way of the I/O interface 201 (step S301). The received data includes both a print command specifying a printing process, and print data. The print command contains information indicative of whether the print data sent after the print command is to be printed on the front or back side of the print medium. It is to be noted that a print command indicating that the print data is to be printed to the front side of the print medium is hereafter referred to as form front printing command, and a print command indicating that the print data is to be printed to the back side of the print medium is hereafter referred to as form back printing command. A print medium usable in this printer are also referred to below as simply a "form."

When a form is inserted from the form insertion opening 102 (step S302), the inserted side detection processor 207 detects whether the form has been inserted with the form front or form back facing a particular direction (step S303).

To accomplish this front/back detection, the inserted form is advanced by a form transportation mechanism comprising transportation rollers 104*a* and 104*b* to a specific position at the MICR reader 103. The MICR reader 103 then attempts to scan the MICR text preprinted to a specific location on the form front. If the MICR reader 103 successfully reads the text and captures a magnetic waveform, a signal representing the magnetic waveform is sent to the inserted side detection processor 207. The inserted side detection processor 207 detects whether the form front or back is facing up based on whether a signal is received from the MICR reader

103. That is, if the MICR reader 103 is able to read MICR text and thus capture a magnetic waveform from the form surface, the form has been inserted with the front facing up for printing to the front; if a magnetic waveform cannot be captured, the form has been inserted face down with the back facing up for printing to the back.

The controller 204 performs a printing process or error handling process based on the results supplied from the received data interpreter 203 and the inserted side detection processor 207.

If the form side detected by the inserted side detection processor 207 is the same as the form side specified by the print command (step S304 returns yes), print data is stored to the print buffer 206. The form is also advanced to a specific position at the print head 105 by the form transportation mechanism. The printing controller 208 then drives the print head 105 to print the print data stored in the print buffer 206 to the form (step S305). When printing is completed the printing controller 208 sends a printing completed signal to the controller 204. When the controller 204 receives this printing completed signal, it sends a printing completed notification from the data transmitter 205 through the I/O interface 201 to the host 220 (step S306).

If the form side detected by the inserted side detection processor 207 is not the same as the form side specified by the print command (step S304 returns no), the controller 204 sends a form insertion error notification from the data transmitter 205 through the I/O interface 201 to the host 220 (step S307).

The form is then ejected (step S308) and the printing process ends once the controller 204 sends either the printing completed notification or form insertion error notification to the host 220. It is preferable in this case to eject the form in different directions depending on whether the form was inserted appropriately and was successfully printed, or was incorrectly inserted and was not printed. For i-example, if the form was correctly inserted and printed and the printing process therefore ended normally, the form is preferably ejected from the form ejection mechanism 107. However, if a form insertion error occurred and the form was not printed, the form is preferably ejected from the form insertion opening 102. In this way the operator can easily determine whether the form was printed and the printing process normally completed, or whether the form must be reinserted and printed.

It is therefore possible by means of a printer according to this first preferred embodiment of the present invention to achieve desired printing results without the host being aware of the specific printer configuration because the printer can determine whether the form side specified for printing by the print command and the side of the form inserted for printing are the same.

It is also possible to prevent wasting print forms because the printing process is not completed when the side of the form inserted for printing does not match the side required for printing by the print command.

Embodiment 2

Figure 4:
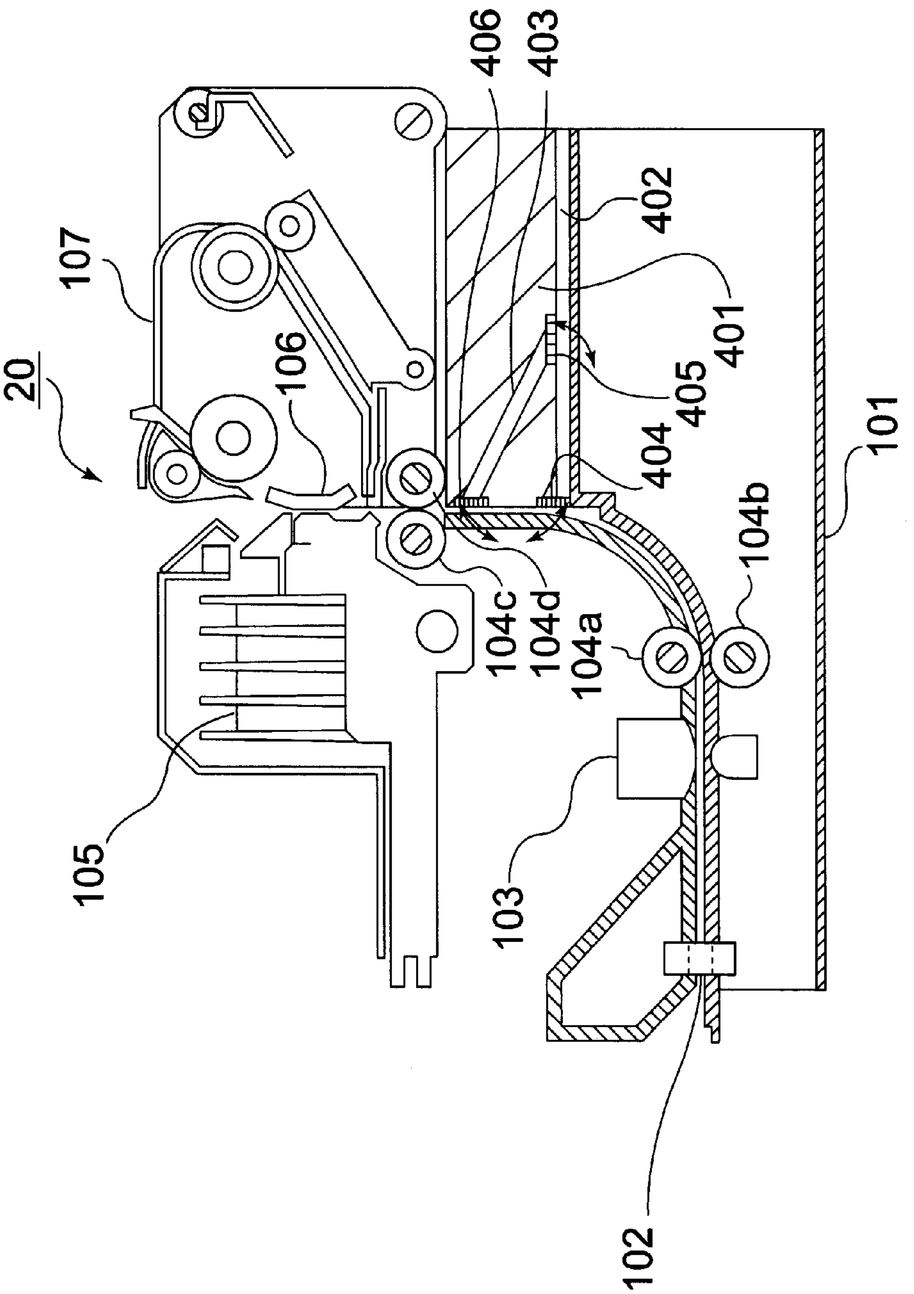
FIG. 4 is a cross-sectional view of a printer according to a second preferred embodiment of the present invention.

FIG. 4 is a cross-sectional view of a printer according to a second preferred embodiment of the present invention. It is to be noted that like parts in FIG. 4 and FIG. 1 are identified by like reference numerals, and further description thereof is omitted below. Furthermore, a printer 20 according to this second exemplary embodiment of the present invention differs from the printer 10 shown in FIG. 1 in that it comprises a form reversing mechanism 401 for reversing the front and back sides of an inserted form.

This form reversing mechanism 401 comprises a form loading path 402 for advancing an inserted form, form reversing path 403 for withdrawing a form from the form reversing mechanism 401, and gates 404 to 406 for opening and closing the openings to the form loading path 402 and form reversing path 403. To reverse a form, gate 404 is operated to open the entrance to the form loading path 402. Gate 405 at this time blocks the entrance to form reversing path 403. The form is then temporarily stored all the way inside the form loading path 402, that is, all the way to the right as seen in FIG. 4. Gate 405 is then operated to open the entrance to form reversing path 403, and gate 406 is operated to open the exit from the form reversing path 403. After thus opening gates 405 and 406, the form is ejected through the form reversing path 403 from its stored position inside the form loading path 402. The front and back sides of the form are thus reversed from the orientation in which the form was inserted.

Figure 5:
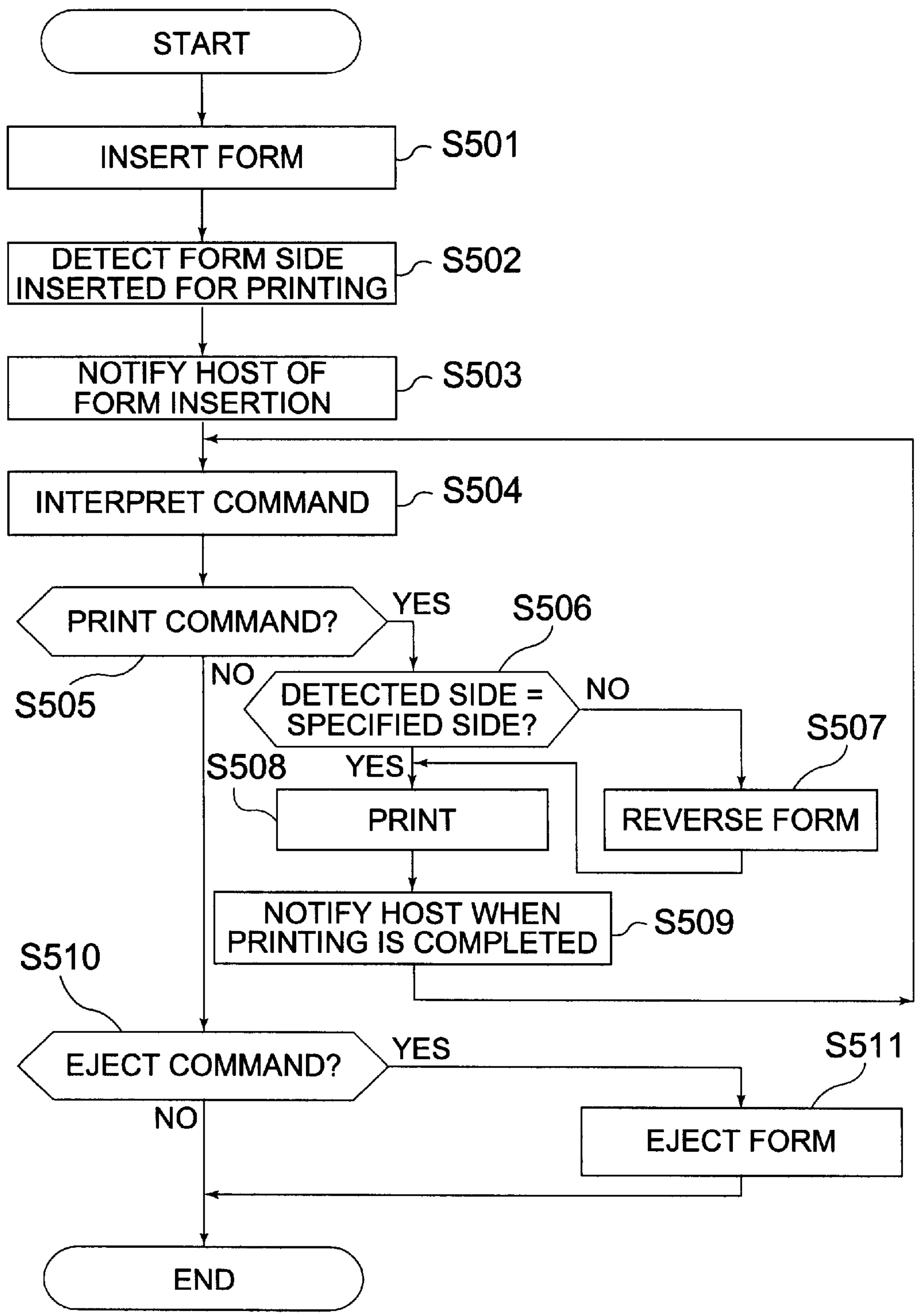
FIG. 5 is a flow chart of a printing process in the printer shown in FIG. 4.

FIG. 5 is a flow chart used to describe an exemplary printing process of the printer shown in FIG. 4 according to this second embodiment of the invention.

When a form is inserted from the form insertion opening 102 (step S501), the inserted side detection processor 207 detects whether the form has been inserted with the form front or form back facing a particular direction (step S502) as described above. The controller 204 then sends a form insertion notification from the data transmitter 205 through the I/O interface 201 to the host 220 (step S503). In response to this notification, the host 220 sends data to the printer 20.

The data sent from the host 220 through the I/O interface 201 is then received by the data receiver 202 of the printer 20 and interpreted by the received data interpreter 203 (step S504). This data typically includes a print command for accomplishing a printing process, print data, and a form ejection command.

The controller 204 performs a printing process as described below based on the results supplied from the received data interpreter 203 and the inserted side detection processor 207.

If the received data interpreter 203 detects a print command in the data received from the host 220 (step S505 returns yes), print data contained in the data received from the host 220 is stored to the print buffer 206.

If the form side detected by the inserted side detection processor 207 is the same as the form side specified by the print command (step S506 returns yes), the form is advanced to a specific position at the print head 105 by the form transportation mechanism.

If the form side detected by the inserted side detection processor 207 is not the same as the form side specified by the print command (step S506 returns no), the form is inverted by the form reversing mechanism 401 (step S507), and then advanced to a specific position at the print head 105 by the form transportation mechanism.

The printing controller 208 then drives the print head 105 to print the print data stored in the print buffer 206 to the form (step S508). When printing is completed the printing controller 208 sends a printing completed signal to the controller 204. When the controller 204 receives this printing completed signal, it sends a printing completed notification from the data transmitter 205 through the I/O interface 201 to the host 220 (step S509).

If the received data interpreter 203 detects that a print command is not received (step S505) and a form ejection command in the data received from the host 220 (step S510 returns yes), the form is ejected by the form ejection mechanism 107 (step S511).

If the received data interpreter 203 does not detect print commands (a printfront command, print-back command (step 505)), and form ejection command in the data received from the host 220 (step 510), the printing process is terminated because a command for a process other than a printing process was received.

It is therefore possible by means of a printer according to this second preferred embodiment of the present invention to prevent wasting print forms, improve printing efficiency, and achieve desired printing results without the host being aware of the specific printer configuration because the printer can determine whether the form side specified for printing by the print command and the side of the form inserted for printing are the same, and if they are not the same can automatically reverse the form so that the desired side of the form is presented for printing and then complete the printing process.

Embodiment 3

Figure 6:
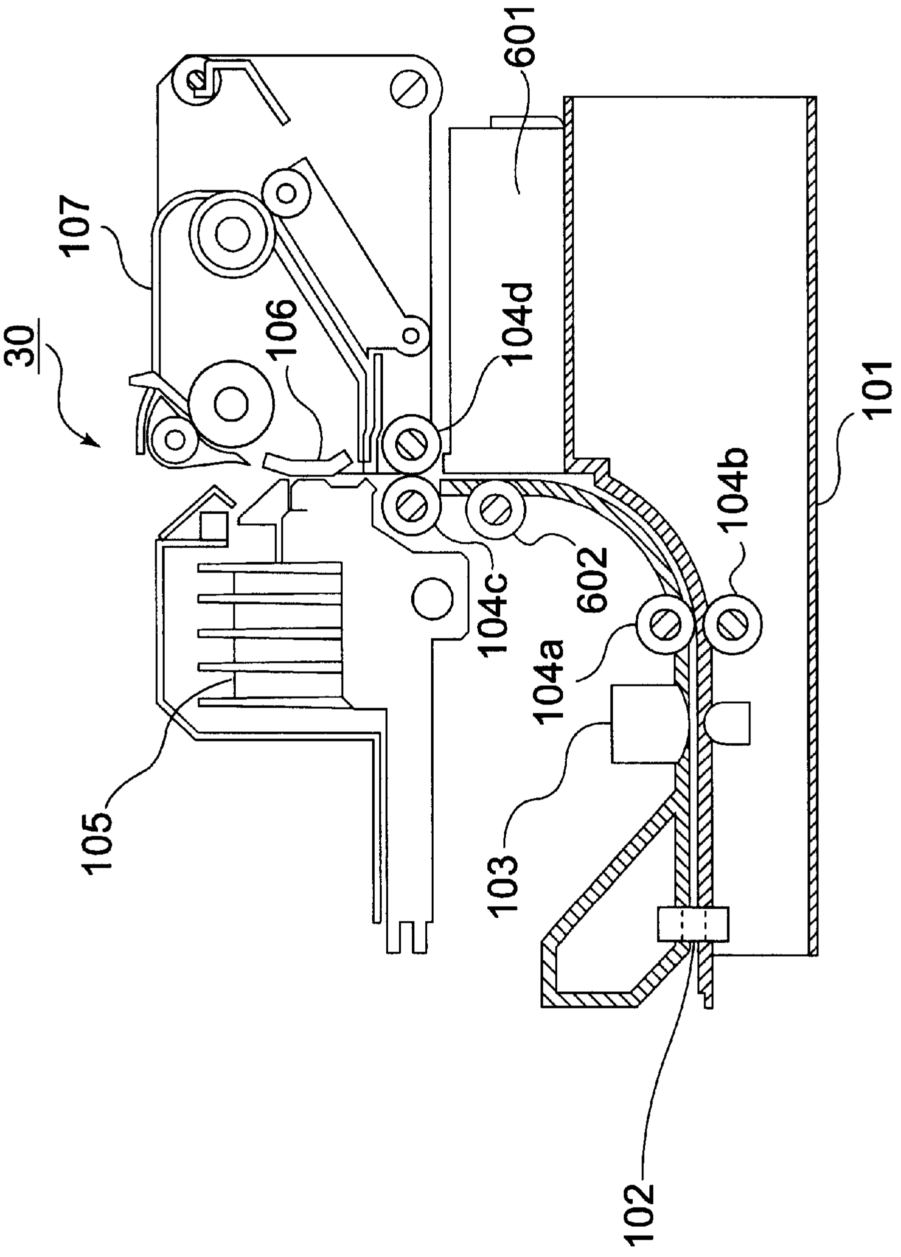
FIG. 6 is a cross-sectional view of a printer according to a third preferred embodiment of the present invention.

FIG. 6 is a cross-sectional view of a printer according to a third preferred embodiment of the present invention. It is to be noted that like parts in FIG. 6 and FIG. 1 are identified by like reference numeral, and further description thereof is omitted below. Furthermore, a printer 30 according to this second exemplary embodiment of the present invention differs from the printer 10 shown in FIG. 1 in that it comprises two printing mechanisms. That is, in addition to print head 105 and platen 106, this printer 30 comprises a print head 601 and platen 602. As shown in the figure, print head 105 and print head 601 are disposed on opposite sides of the form transportation path.

Figure 7:
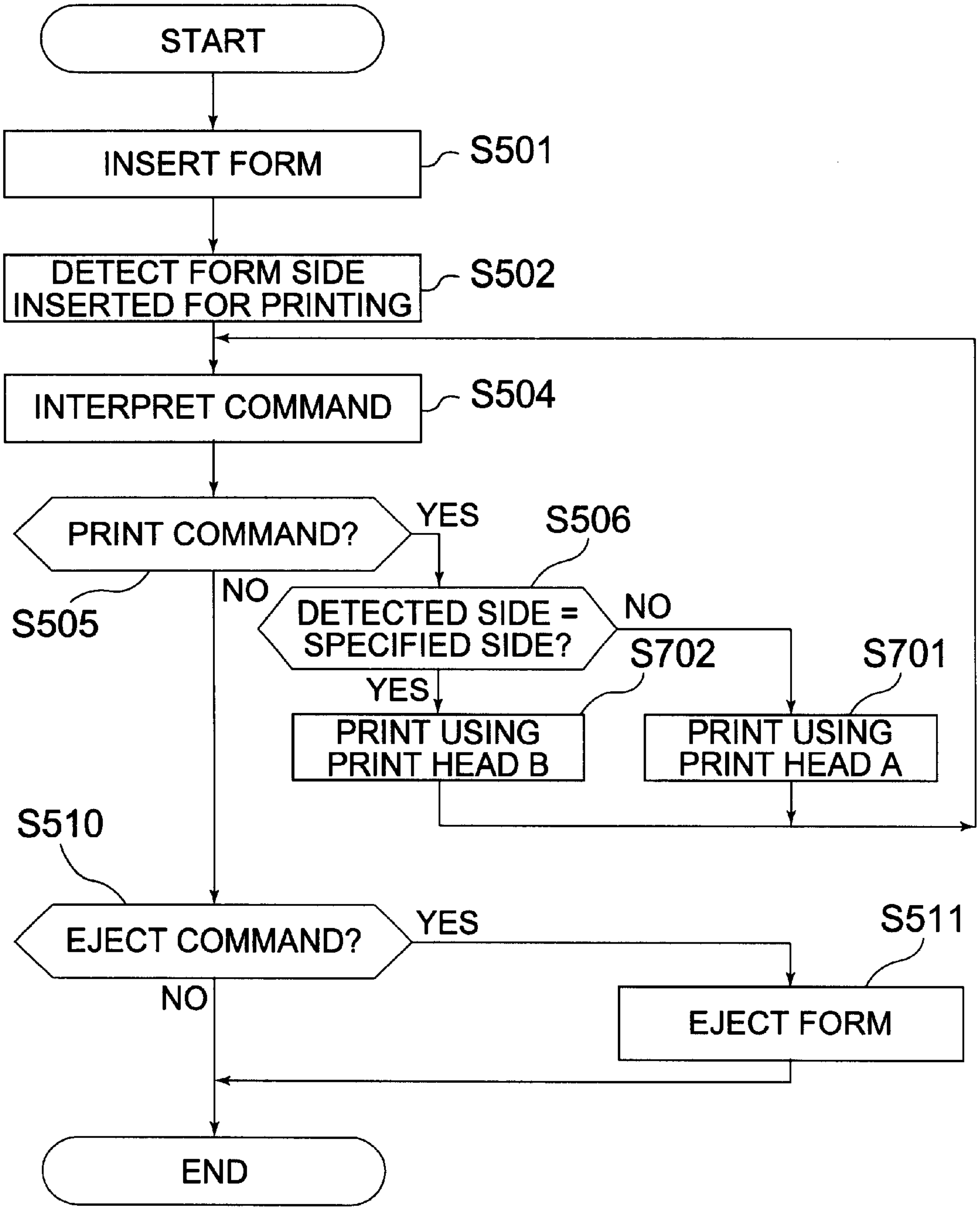
FIG. 7 is a flow chart of a printing process in the printer shown in FIG. 6.

FIG. 7 is a flow chart used to describe an exemplary printing process of the printer shown in FIG. 6 according to this third embodiment of the invention. It is to be noted that like steps in FIG. 5 and FIG. 7 are identified by like reference numeral, and further description thereof is omitted below.

When a form is inserted and a print command is received (steps S501 to S505) as described above, the controller 204 performs a printing process as described below.

If the form side detected by the inserted side detection processor 207 is the same as the form side specified by the print command (step S506 returns yes), the form is advanced to a specific position at the print head 105 by the form transportation mechanism. The printing controller 208 then drives the print head 105 to print the print data stored in the print buffer 206 to the form (step S701).

If the form side detected by the inserted side detection processor 207 is not the same as the form side specified by the print command (step S506 returns no), the form is advanced to a specific position at the print head 601. The printing controller 208 then drives the print head 601 to print the form back print data stored in the print buffer 206 to the form (step S702).

It is therefore possible by means of a printer according to this third preferred embodiment of the present invention to prevent wasting print forms, improve printing efficiency, and achieve desired printing results without the host being aware of the specific printer configuration because the printer can automatically select which print head to use for the printing process based on which side of the form was inserted facing a particular direction.

Embodiment 4

Figure 8:
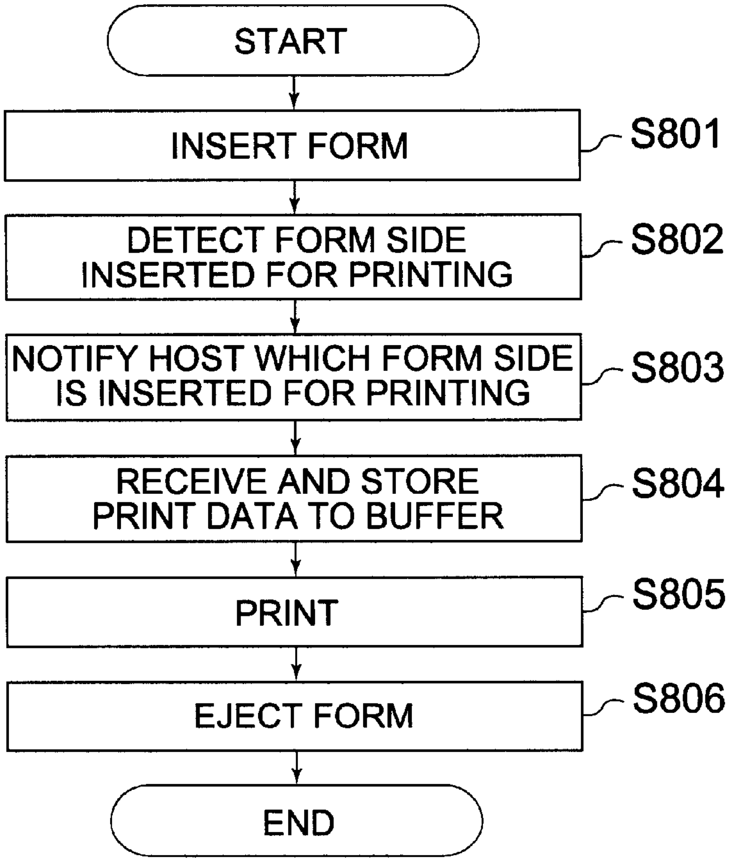
FIG. 8 is a flow chart of a printing process according to a fourth preferred embodiment of the present invention.
Figure 9:
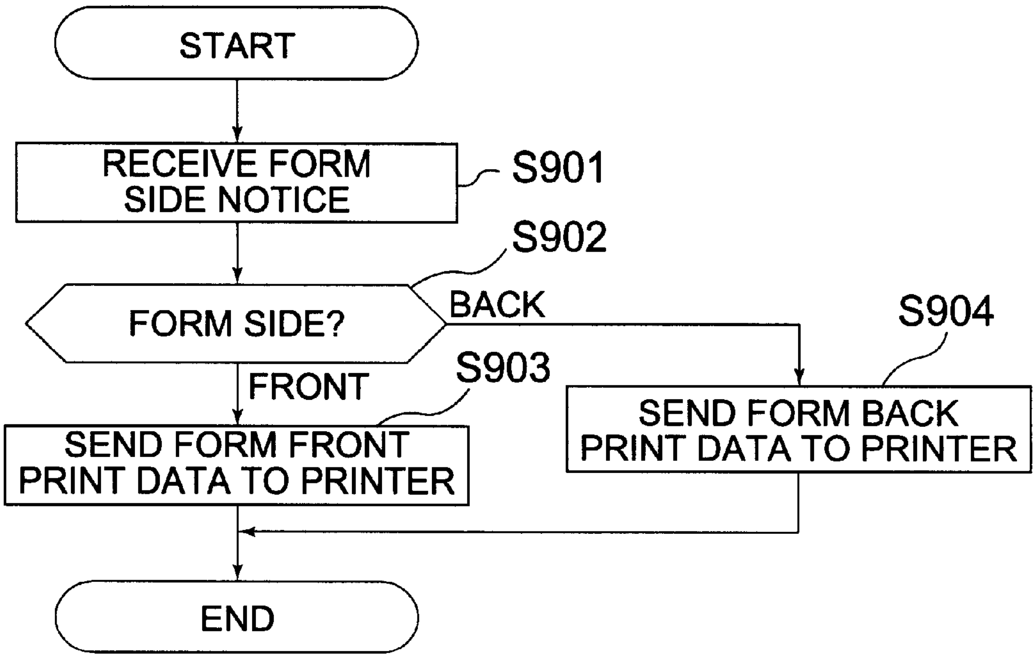
FIG. 9 is a flow chart of a process performed by a host device during execution of the printing process according to a fourth preferred embodiment of the present invention.

FIG. 8 is a flow chart used to describe an exemplary printing process of a printer according to a fourth embodiment of the invention. FIG. 9 is a flow chart of a process performed by the host. It is to be noted that the control unit and configuration of a printer 40 according to this fourth embodiment of the invention are identical to those of the above-described first embodiment.

When a form is inserted from the form insertion opening 102 of the printer 10 (step S801), the inserted side detection-processor 207 detects whether the form has been inserted with the form front or form back facing a particular direction (step S802) as described above. The controller 204 then notifies the host 220 which side was detected by the inserted side detection processor 207 (step S803). That is, if the inserted side detection processor 207 detects the front of the form facing up, the controller 204 sends a "front" form side notification to the host 220 through the I/O interface 201; if the back of the form is detected, the controller 204 sends a "back" form side notification to the host 220.

When the host 220 receives a form side notification from the printer 10 (step S901), it detects whether the notification indicates the front or back side of the form (step S902). If a front side notification is received (step S902 returns "front"), the host 220 sends data for printing to the form front to the printer 10 (step S903). However, if a back side notification is received (step S902 returns "back"), the host 220 sends data for printing to the form back to the printer 10 (step S904).

The printer 10 thus appropriately receives print data corresponding to the front or back side orientation of the inserted form from the host 220 through the I/O interface 201 and data receiver 202, and stores the received print data to print buffer 206 (step S804). The printing controller 208 then drives the print head 105 to print the print data stored to print buffer 206 to the inserted form (step S805), and then ejects the form from the form ejection mechanism 107 (step S806).

It is to be noted that if the form side desired for printing does not match the side indicated by the form side notification from the printer, the host can alternatively send a form ejection command instead of sending print data, and can notify the printer of a form insertion error.

It is therefore possible to achieve desired printing results with a printer and control method according to this fourth embodiment of the present invention because the printer detects and informs the host which side of the inserted form is facing a particular direction, and the host then sends print data for printing to the form front or back according to the notification received from the printer.

Embodiment 5

Figure 10:
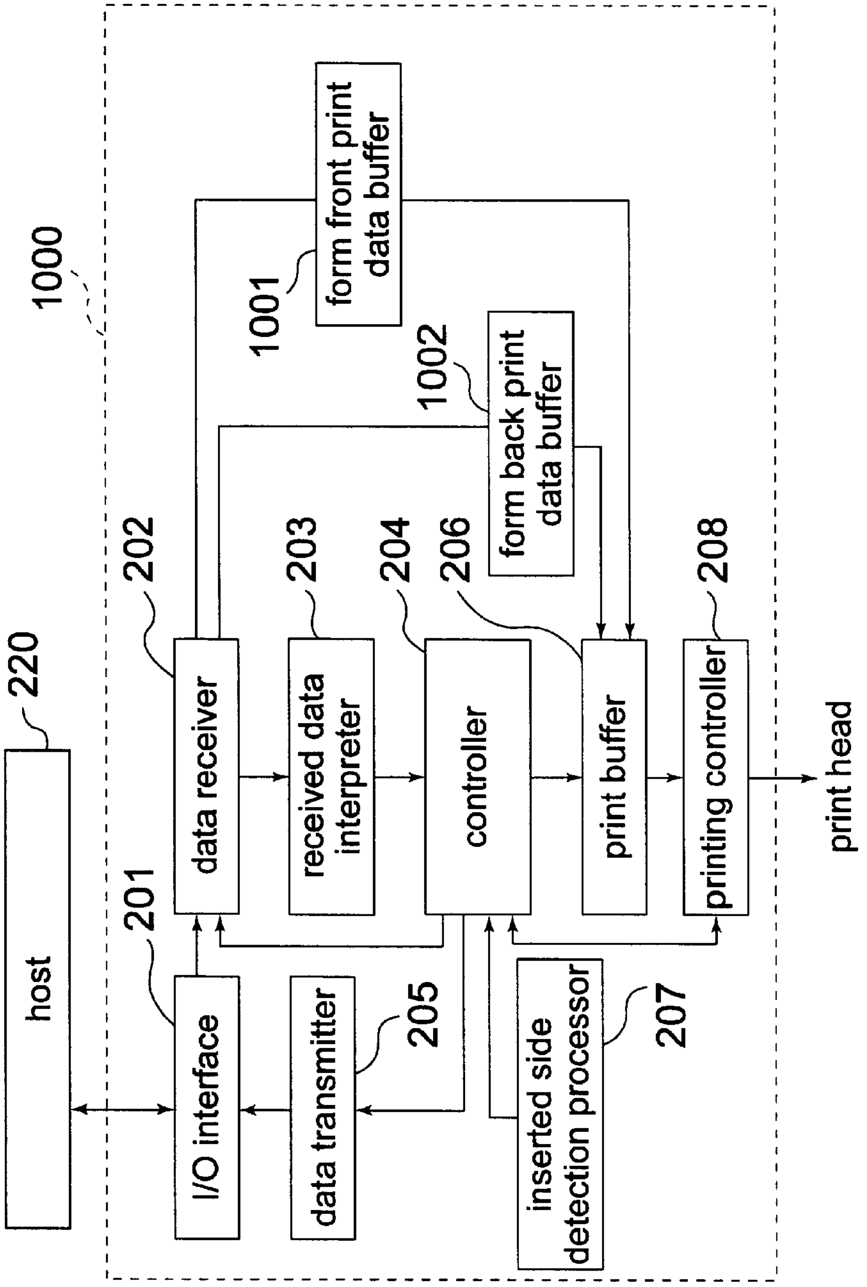
FIG. 10 is a functional block diagram of a control unit in a printer according to a fifth preferred embodiment of the present invention.

FIG. 10 is a block diagram of control unit functions for a printer according to this fifth embodiment of the invention. It is to be noted that like parts in FIG. 2 and in FIG. 10 are identified by like reference numeral, and further description thereof is omitted below. As shown in FIG. 10 a printer 50 according to this fifth embodiment of the invention differs from a printer 10 according to the first embodiment above in that it comprises a form front print data buffer 1001 and a form back print data buffer 1002. This form front print data buffer 1001 stores print data received from the host 220 for printing to the front of an inserted form, and the form back print data buffer 1002 similarly stores print data for printing to the back of the form. Depending on whether the form is inserted with the front or back facing a particular direction, the print buffer 206 temporarily stores print data from either the form front print data buffer 1001 or form back print data buffer 1002.

Figure 11:
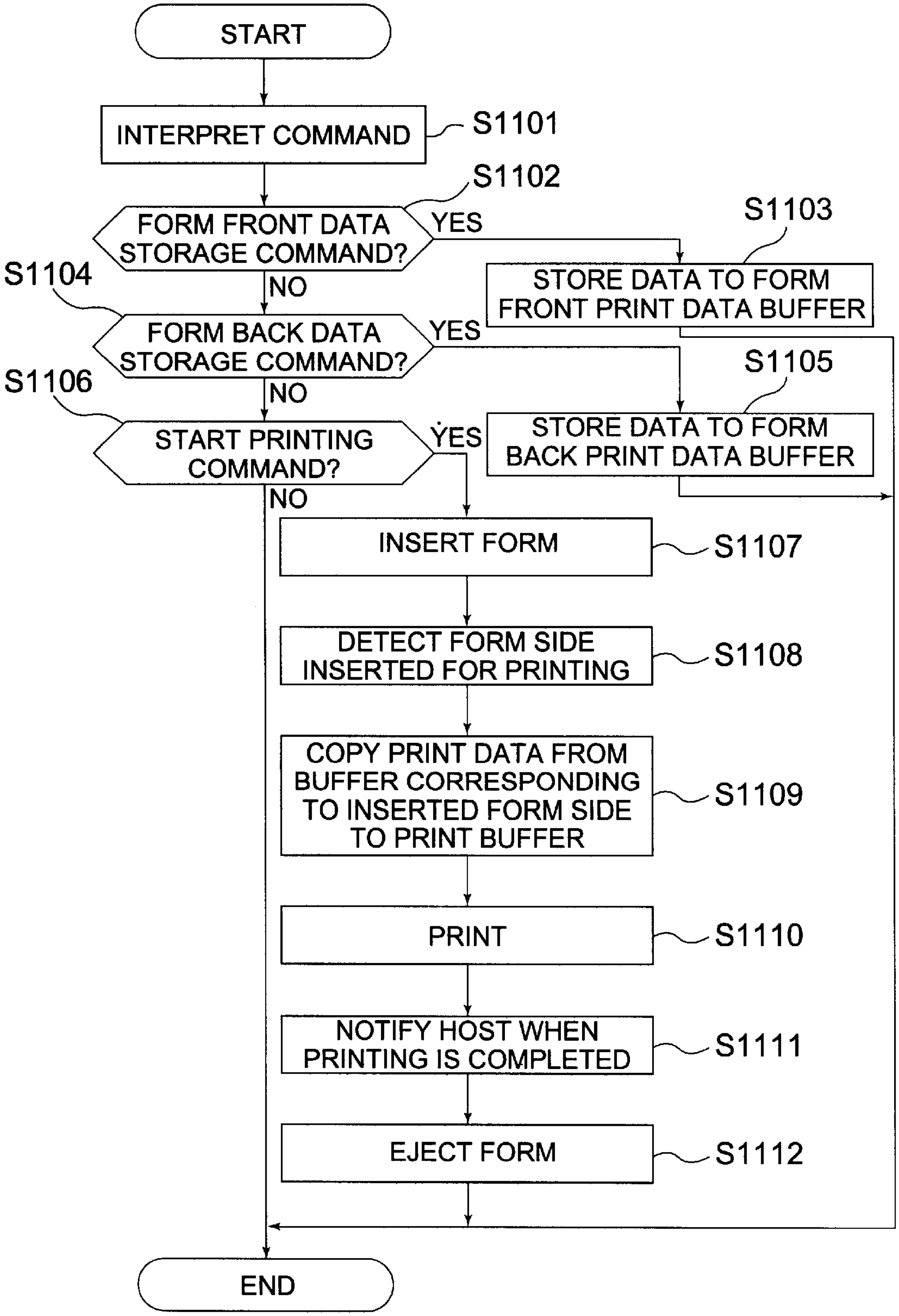
FIG. 11 is a flow chart of a printing process according to a fifth preferred embodiment of the present invention.

FIG. 11 is a flow chart used to describe a printing process of a printer according to this fifth embodiment of the invention.

The printer 50 receives data from the host 220 into the data receiver 202 through the I/O interface 201, and the received data interpreter 203 then interprets the received data (step S1101).

The controller 204 performs a printing process as described below based on the results supplied from the received data interpreter 203.

If the received data interpreter 203 detects a form front data storage command (step S1102 returns to yes), the controller 204 sends a request to the host 220 from the data transmitter 205 by way of the I/O interface 201 to start sending data. When the host receives this sending start request, it begins sending the front data to the printer 50. The printer 50 then stores the form front print data received from the host 220 through the I/O interface 201 and data receiver 202 to the form front print data buffer 1001 (step S1103).

If the received data interpreter 203 detects a form back data storage command (step S1104 returns to yes), the controller 204 sends a request to the host 220 from the data transmitter 205 by way of the I/O interface 201 to start sending data. When the host receives this start sending request, it begins sending the back data to the printer 50 . The printer 50 then stores the form back print data received from the host 220 through the I/O interface 201 and data receiver 202 to the form back print data buffer 1002 (step S1105).

If the received data interpreter 203 detects a start printing command (step S1106 returns to yes), the controller 204 starts a printing process. This printing process starts by form insertion (step S1107) and the inserted side detection processor 207 detecting whether the form front or back is facing up (step S1108). Based on which side of the form is facing the particular direction, that is, up in this example, print data is copied from the appropriate form front print data buffer 1001 or form back print data buffer 1002 to the print buffer 206 (step S1109).

That is, if the form is inserted with the front facing up in this example, the controller 204 copies the print data stored to the form front print data buffer 1001 to the print buffer 206. If the form is inserted with the back facing up in this example, the controller 204 copies the print data stored to the form back print data buffer 1002 to the print buffer 206.

The printing controller 208 then drives the print head 105 to print the print data stored in the print buffer 206 to the form (step S1110). When printing is completed the printing controller 208 sends a printing completed signal to the controller 204. When the controller 204 receives this printing completed signal, it sends a printing completed notification indicative that the inserted side has been printed from the data transmitter 205 through the I/O interface 201 to the host 220 (step S111). The form is then ejected by the form ejection mechanism 107 (step S1112).

It is to be noted that when print data is sent from the host 220 to the printer 50, the print data can be sent in conjunction with a data storage command. In this case the data receiver 202 buffers the print data while the received data interpreter 203 interprets the data storage command.

It is further possible to send a storage command, start printing command, and print data simultaneously. In this case the data receiver 202 buffers the print data while the received data interpreter 203 interprets the data storage command, the received print data is stored to either the form front print data buffer 1001 or form back print data buffer 1002, and the start printing command is then executed.

By thus storing form front print data and form back print data in separate buffers and detecting which side of the inserted form is facing a particular direction, a printer according to this fifth embodiment of the present invention can selectively print data stored to the buffer corresponding to the particular form side.

Furthermore, by storing print data in the printer, steps for sending data that is printed repeatedly can be eliminated, and printer throughput and efficiency can thus be improved.

It is to be further noted that the preceding embodiments of the present invention have been described as using MICR text preprinted to a specific location on a form and an MICR text reader for detecting the form insertion direction. The invention shall obviously not be so limited, however, and MICR text and an MICR reader can be respectively replaced with a bar code and bar code reader, for example.

It is further possible to differentiate form sides based on the shape of the form using an exemplary method as described below.

Exemplary Methods for Detecting a Form Insertion Side Based on form Shape

An exemplary print medium according to the present invention has, for example, a corner cut off at the top left and bottom right corners of the form as seen from the form front or face. These corners can be detected using, for example, a photodetector to determine the insertion direction and form side.

Figure 12:
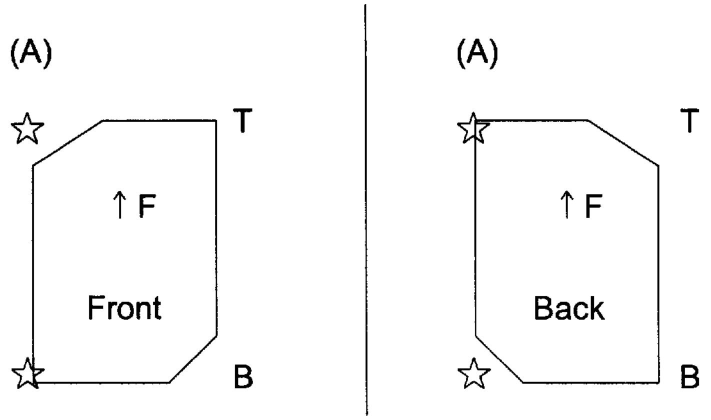
FIG. 12 is used to describe an exemplary method according to the present invention for detecting which side of a print medium is facing a particular direction.

In FIG. 12, the inserted side detection processor 207 has a single detector disposed at position (A), that is, the left edge of the long side of the form as seen in FIG. 12. An inserted form advances in the direction of arrow F. As a result, the detector (A) detects the form at two points as indicated by the stars in FIG. 12. The results of this form edge detection can then be used to detect the front and back of the inserted form by referring to a table as shown in FIG. 12.

For example, if the form is inserted from form top T, no form is detected when leading edge T is advanced to detector position (A), and the form is then detected when form bottom B reaches position (A), the form is determined to have been inserted face up.

Figure 13:
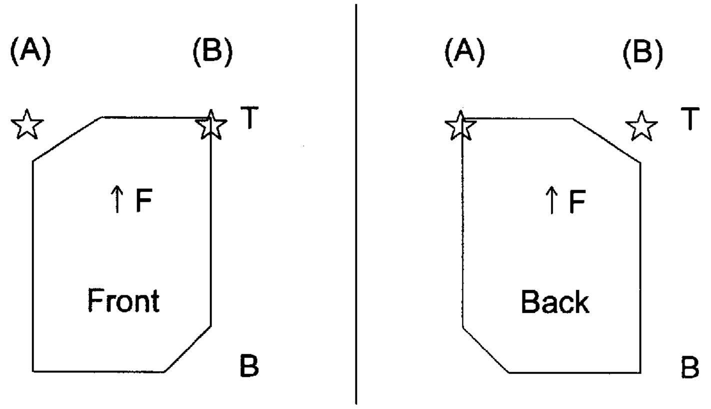
FIG. 13 is used to describe a further exemplary method according to the present invention for detecting which side of a print medium is facing a particular direction.

FIG. 13 shows an alternative embodiment in which detectors are disposed at positions (A) and (B), that is, at both right and left long edges of the form. In this case an inserted form is detected by detectors at two points (A) and (B). The results of this form edge detection can again be used to detect the front and back of the inserted form by referring to a table as shown in FIG. 13.

For example, if the form is inserted from form top T, no form is detected at detector (A) when form top T is advanced to detector position (A) but the form is detected at detector (B), the form is determined to have been inserted face up.

It is also possible using two detectors (A) and (B) to determine which side of the form is inserted facing a particular direction, and whether the form has been inserted with the long or short side of the form leading, that is the insertion direction. In this case an inserted form is advanced in the direction of arrow F and the form is detected at four points by detectors (A) and (B) as indicated by the stars in FIG. 14. The results of this form edge detection can again be used to detect the front and back of the inserted form and whether the long or short edge is leading by referring to a table as shown in FIG. 14.

Figure 14:
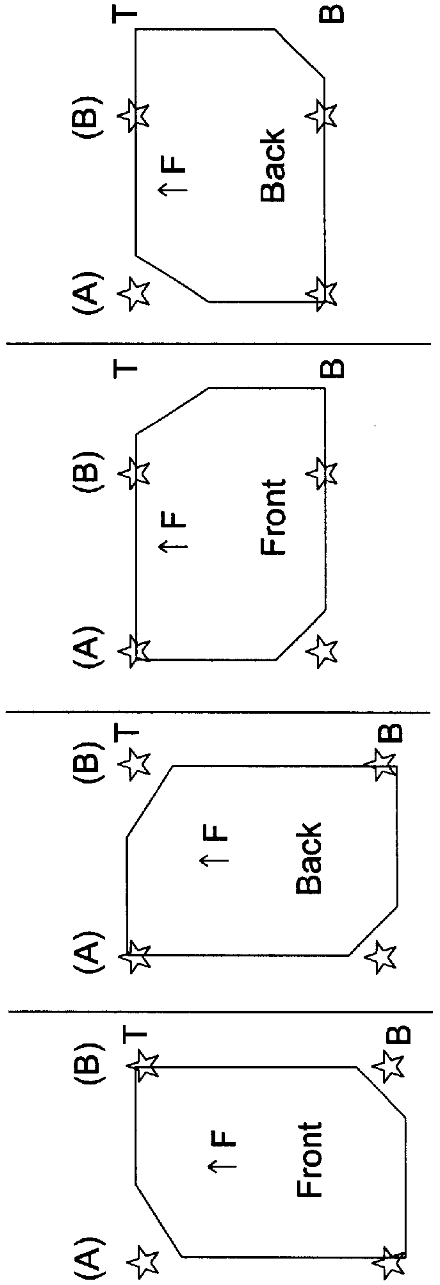
FIG. 14 is used to describe an exemplary method according to the present invention for detecting which side of a print medium is facing a particular direction and the direction in which the print medium is inserted.

For example, if detector (B) returns different results at edges T and B of the form, the form has been inserted lengthwise to the printer as shown on the left side in FIG. 14. However, if detector (B) returns the same result at edges T and B of the form, the form has been inserted widthwise to the printer as shown on the right side in FIG. 14. The front and back sides of the form can also be detected using the same logic used and shown in FIG. 12.

Figure 15:
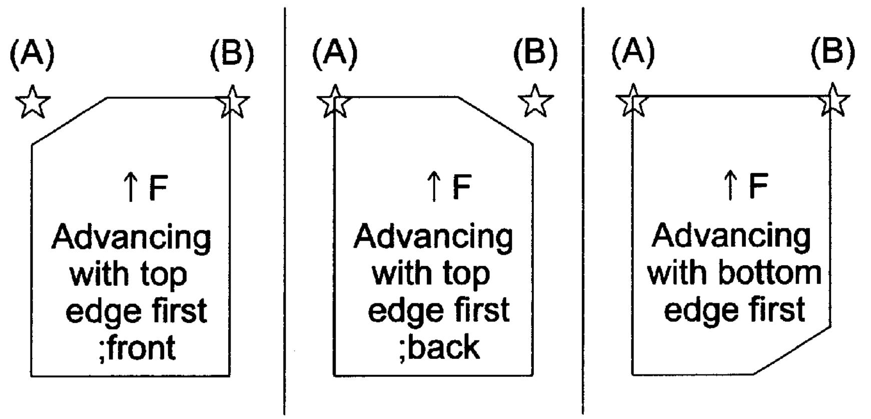
FIG. 15 is used to describe a further exemplary method according to the present invention for detecting which side of a print medium is facing a particular direction and the direction in which the print medium is inserted.

Form detection when the form is notched at only one corner, that is, at the top left as seen from the form front, is described next with reference to FIG. 15. Detectors are again provided at positions (A) and (B) as in FIG. 13. When a form is inserted it is immediately detected at both positions (A) and (B). The results of this detection can then be used to detect whether the form has been inserted front or back side up, or with the normally trailing bottom edge first. The form front is again viewed as shown in FIG. 12 to FIG. 14.

FIG. 16 shows a further case in which detectors are provided as above at points (A) and (B) and at an additional point (C) corresponding to the right edge of a form when inserted widthwise as shown on the right in FIG. 16. In this case an inserted form advanced in the direction of arrow F is detected at six points by detectors (A), (B), and (C). In this case it is possible to detect the front and back of an inserted form, as well as the top, bottom, right, and left sides of the form. The form front in this case is also viewed as shown in FIG. 12 to FIG. 14.

Embodiment 6

Figure 17:
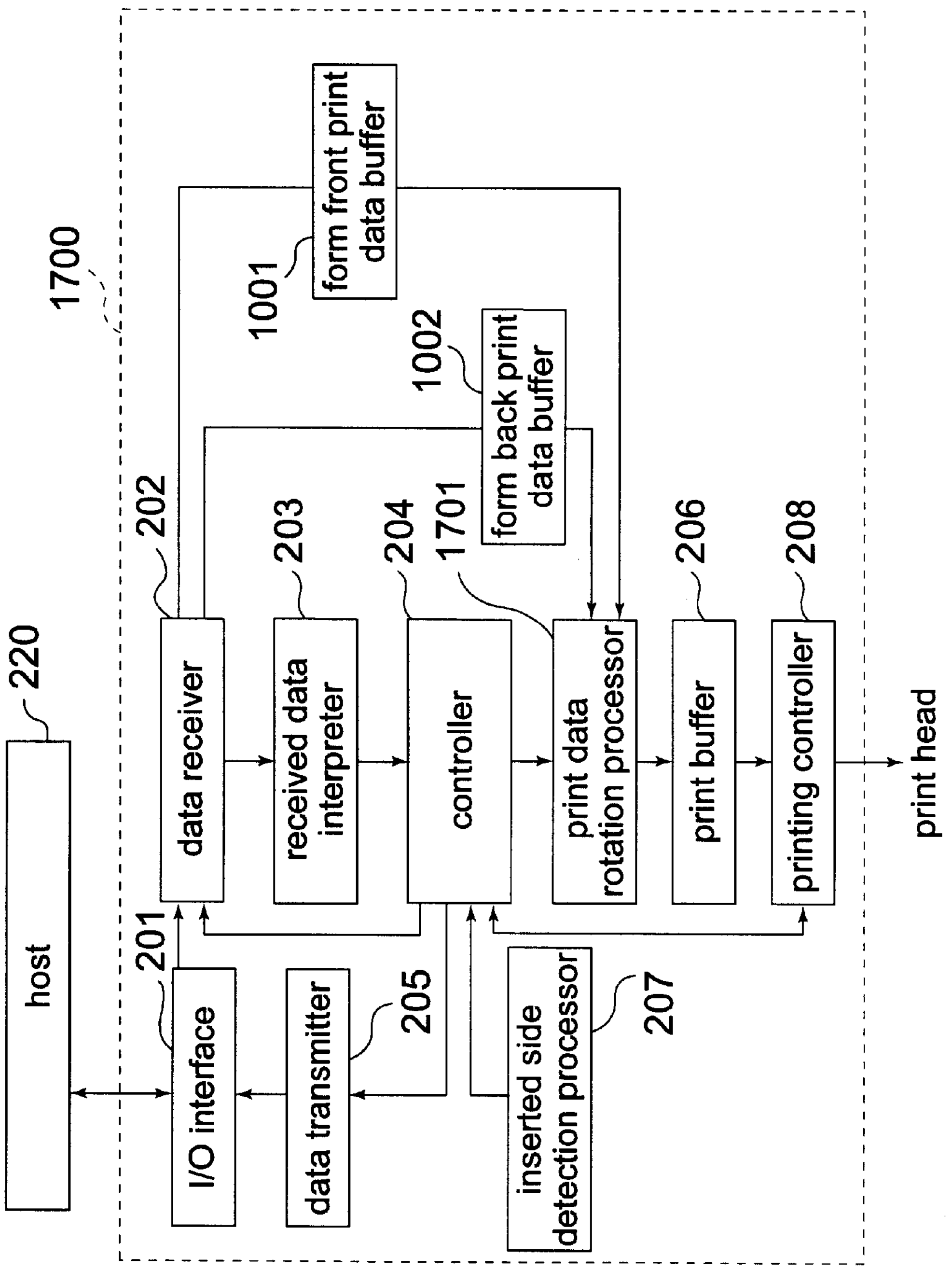
FIG. 17 is a functional block diagram of a control unit in a printer according to a sixth preferred embodiment of the present invention.

FIG. 17 is a block diagram of control unit functions for a printer according to a sixth embodiment of the invention. It is to be noted that like parts in this and the first embodiment above are identified by like reference numeral, and further description thereof is omitted below.

As shown in FIG. 17 a printer 60 according to this sixth embodiment of the invention differs from a printer 10 according to the first embodiment above in that it comprises a form front print data buffer 1001 and a form back print data buffer 1002, and a print data rotation processor 1701. The print data rotation processor 1701 rotates print data read from the form front print data buffer 1001 or form back print data buffer 1002 based on which side of the inserted form is facing a particular direction, and which edge of the form is leading. In addition, print data rotated by the print data rotation processor 1701 is stored to the print buffer 206 and printed.

Figure 18:
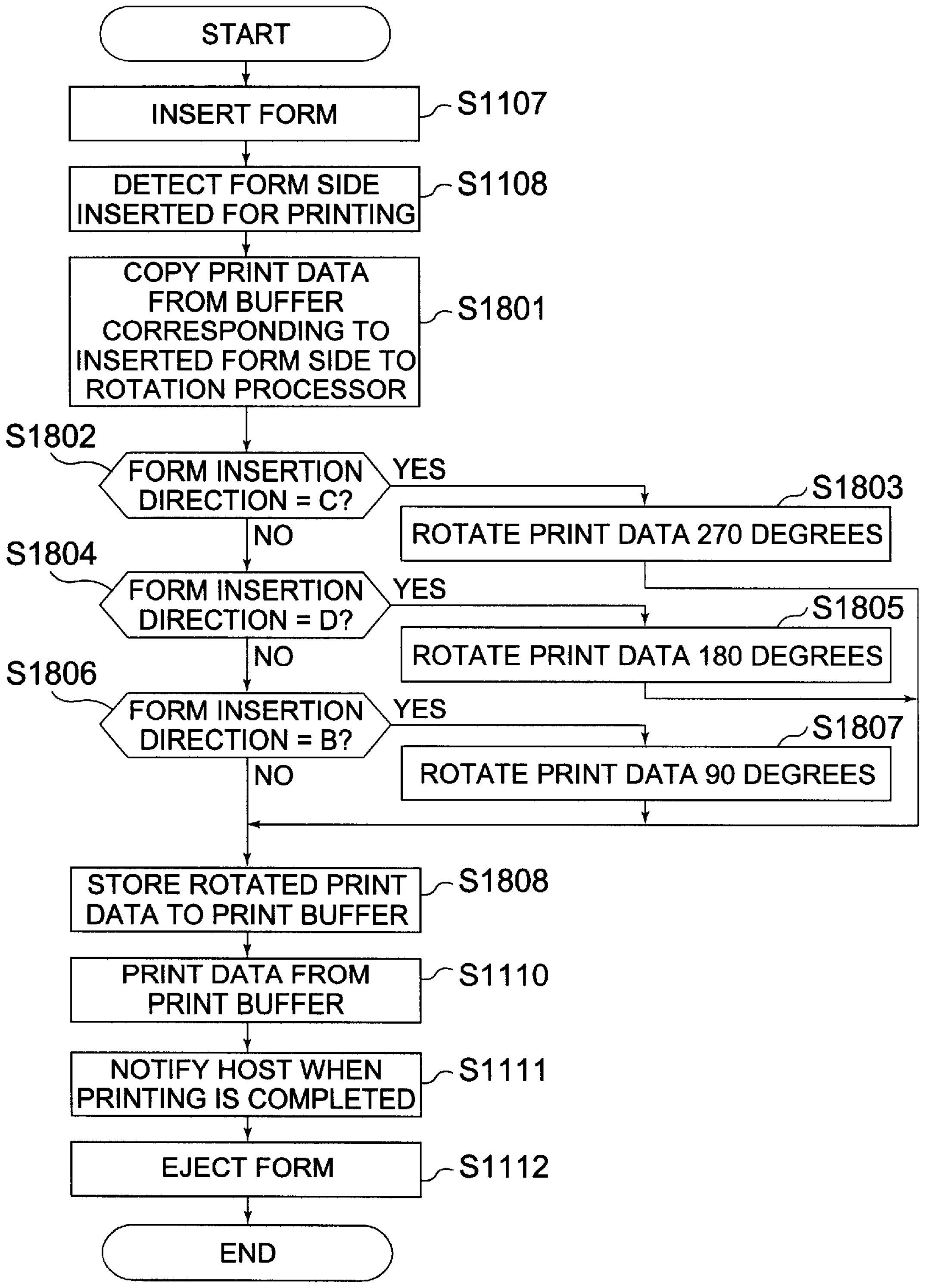
FIG. 18 is a flow chart of a printing process according to a sixth preferred embodiment of the present invention.
Figure 19:
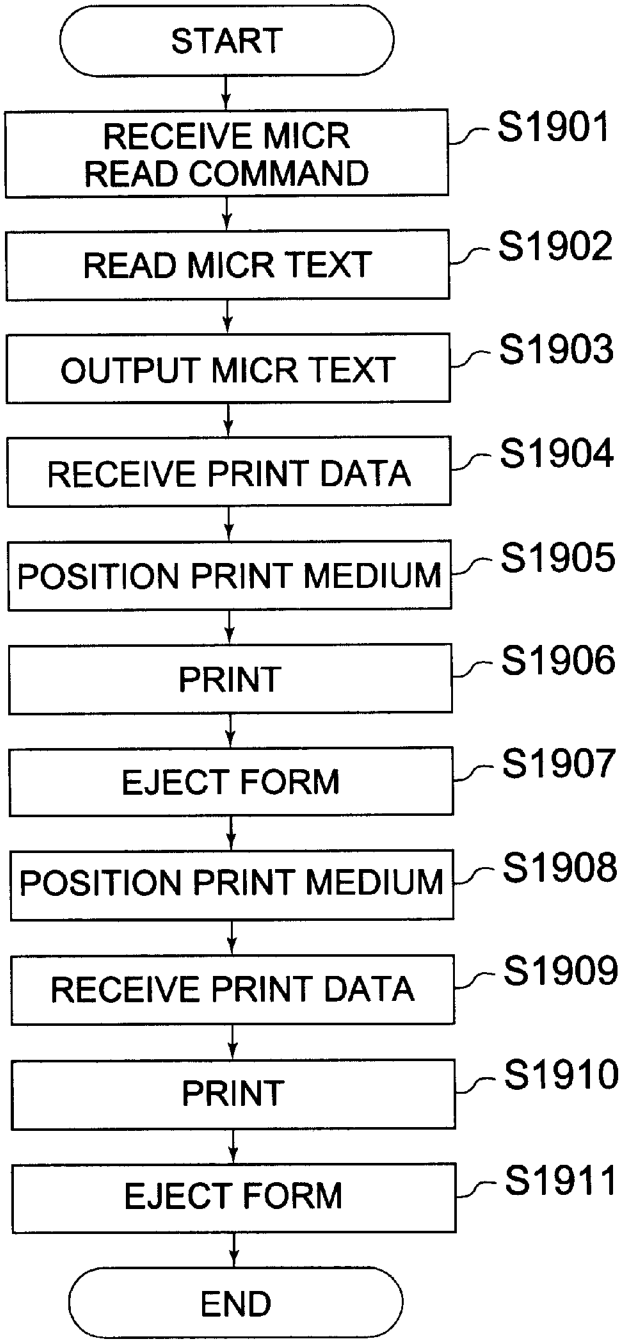
Prior Art FIG.19
FIG. 19 is a flow chart of a conventional printing process for printing to both sides of a standardized form according to the related art.

FIG. 18 is a flow chart used to describe an exemplary printing process of the printer shown in FIG. 17 according to this sixth embodiment of the invention. It is to be noted that like steps in FIG. 17 and the above-noted flow charts are identified by like reference numeral, and further description thereof is omitted below.

This printer 60 prepares for printing by means of steps S1101 to S1106 shown in FIG. 11. When a form is inserted (step S1107), the inserted side detection processor 207 determines whether the form front or back is facing up (step S1108). Based on which side of the form is facing the particular direction, that is, up in this example, print data is copied from the appropriate form front print data buffer 1001 or form back print data buffer 1002 to the print data rotation processor 1701 (step S1801).

The controller 204 then obtains the form insertion direction detected by the inserted side detection processor 207 (see directions a, b, c, and d in FIG. 16).

If the form insertion direction is c (step S1802), the print data in the print data rotation processor 1701 is rotated clockwise 270 degrees (step S1803) and then sent to the print buffer 206.

If the form insertion direction is d (step S1804), the print data in the print data rotation processor 1701 is rotated clockwise 180 degrees (step S1805) and then sent to the print buffer 206.

If the form insertion direction is b (step S1806), the print data in the print data rotation processor 1701 is rotated clockwise 90 degrees (step S1807) and then sent to the print buffer 206.

The print buffer 206 temporarily stores the print data rotated by the print data rotation processor 1701 (step S1808). The printing controller 208 then drives the print head 105 to print the print data stored in the print buffer 206 to the form (step S1110). When printing is completed the printing controller 208 sends a printing completed signal to the controller 204. When the controller 204 receives this printing completed signal, it sends a printing completed notification from the data transmitter 205 through the I/O interface 201 to the host 220 (step Slill). The printed form is then ejected by the form ejection mechanism 107 of the printer 60 (step S1112).

It will also be obvious that while this exemplary embodiment of the invention is described rotating test 0 degrees, 90 degrees, 180 degrees, or 270 degrees to accommodate four directions, text can alternatively be rotated to other angles. Furthermore, text can be rotated clockwise as noted above, counterclockwise, or a combination of both to desirably shorten the data processing time.

It is therefore possible by means of a printer according to this sixth embodiment of the present invention to achieve desirable printing results by storing form front print data and form back print data in separate buffers, and rotating the print data according to the insertion direction and side of the inserted form.

As described above, it is possible by means of a printer, a printer control method, and a data medium according to the present invention to determine whether the side of a form inserted for printing matches the side of the form specified by a print command. As a result, desirable printing results can be achieved and wasting printing forms as a result of printing to the wrong side of the form can be prevented. Printer throughput and efficiency can therefore be improved.

Furthermore, the host device can easily control the printing process without the host device being switched or set to match a particular printer configuration.

Yet further, the printer operator can use the printer without concern for whether a form is inserted with one side facing a particular direction or whether the form is inserted with a particular edge leading through the form transportation path.

Although the present invention has been described in connection with the preferred embodiments thereof with reference to the accompanying drawings, it is to be noted that various changes and modifications will be apparent to those skilled in the art. For example, the present invention has been described with reference to a printer in which the print head and MICR head are disposed to the same side of the form transportation path such that when a form is inserted face or front side up, data is printed to the front or face side of the form. It will be obvious, however, that the print head and MICR head can be disposed to opposite sides of the form transportation path such that when a form is inserted face or front side up, data is printed to the back or opposite side of the form.

Such changes and modifications are to be understood as included within the scope of the present invention as defined by the appended claims, unless they depart therefrom.

What is claimed is:

1. A printer in communication with a host device for printing on a print medium based on print data and a print command received from the host device, comprising:

a print command interpreter to interpret the print command which indicates a predetermined side of the print medium to be printed on by said printer;

an inserted side detector to detect a side of the print medium inserted in said printer which faces a predetermined direction; and a control unit to control said printer to print the print data when the predetermined side interpreted by said print command interpreter is the same as the side of the print medium detected by said inserted side detector which faces the predetermined direction.

2. The printer as set forth in claim 1, wherein said control unit causes the print medium to be ejected from said printer when the predetermined side interpreted by said print command interpreter is different from the side of the print medium detected by the inserted side detector which faces the predetermined direction.

3. The printer as set forth in claim 2, further comprising:

a form insertion opening to insert the print medium; and a form ejection opening to eject the print medium from said printer;

wherein said control unit causes the print medium inserted in said insertion opening to be ejected from said form ejection opening after printing is completed when the predetermined side interpreted by said print command interpreter is the same as the side of the print medium detected by the inserted side detector which faces the predetermined direction, and wherein said control unit causes the print medium inserted in said insertion opening to be ejected from said form insertion opening when the predetermined side interpreted by said print command interpreter is different from the side of the print medium detected by said inserted side detector which faces the predetermined direction.

4. The printer as set forth in claim 1, further comprising a form reversing mechanism to reverse sides of an inserted print medium;

wherein when the predetermined side interpreted by said print command interpreter and the side of the print medium detected by said inserted side detector are different, said form reversing mechanism in response to said control unit reverses a side of the print medium, and then said printer prints the print data on the print medium.

5. The printer as set forth in claim 1, further comprising:

a first printing unit to print the print data on a first side of the print medium, and a second printing unit to print the print data on a second side of the print medium;

wherein said control unit selects either one of said first and second printing unit based on the predetermined side interpreted by said print command interpreter and the side of the print medium detected by said inserted side detector.

6. The printer as set forth in claim 1, further comprising:

an inserted form side notification unit to send to the host device a print medium side notification indicative of the side of the print medium side by said inserted side detector, and a print data receiving unit to receive from the host device print data corresponding to the detected print medium side;

wherein said printer in response to said control unit prints the print data received by said print data receiving unit on the print medium.

7. The printer as set forth in claim 1, further comprising:

a first storage buffer to store print data for printing on a first side of the print medium, and a second storage buffer to store print data for printing on a second side of the print medium;

wherein said control unit selects either one of said first and second storage buffer based on the side of the print medium detected by said inserted side detector and wherein said printer prints on the print medium with the print data from either one of said first and second storage buffer selected by said control unit.

8. The printer as set forth in claim 1, wherein the print medium has a preprinted marking, and wherein said inserted side detector detects an inserted print medium side by detecting the preprinted marking.

9. The printer as set forth in claim 8, wherein the preprinted marking comprises at least either one of a magnetic ink character and bar code.

10. The printer as set forth in claim 1, further comprising:

an insertion direction detector to detect a direction in which the print medium is inserted in said printer, and a print data rotation processor to rotate the print data based on the insertion direction detected by said insertion direction detector.

11. The printer as set forth in claim 10, wherein the print medium has a cutoff at a predetermined corner thereof, wherein said inserted side detector detects the side of the print medium by detecting the cutoff at the predetermined the corner, and wherein said insertion direction detector detects a direction of insertion of the print medium by detecting the cutoff at the predetermined the corner.

12. A control method for a printer in communication with a host device for printing on a print medium based on print data and a print command received from the host device, comprising the steps of:

(a) interpreting the print command which indicates a predetermined side of the print medium side for printing;

(b) detecting a side of the print medium inserted in the printer which faces a predetermined direction; and (c) printing the print data when the predetermined side of the print medium side interpreted in step (a) and the side of the print medium detected by step (b) are the same.

13. The control method as set forth in claim 12, further comprising the step of:

(d) ejecting the print medium when the predetermined side of the print medium side interpreted in step (a) and the side of the print medium detected by step (b) are different.

14. The control method as set forth in claim 13, wherein step (c) further comprises the step of ejecting the print medium from a form ejection opening after printing in step (c) is completed, and wherein step (d) ejects the print medium from a form insertion opening.

15. The control method as set forth in claim 12, further comprising the steps of:

(e) reversing the side of the print medium; and (f) printing the print data on the print medium after step (e) when the predetermined side of the print medium side interpreted in step (a) and the side of the print medium detected by step (b) are different.

16. The control method as set forth in claim 12, wherein step (c) comprises the steps of:

(c1) printing print data on a first side of the print medium; and (c2) printing print data on a second side of the print medium; and (c3) selecting either one of step (c1) and step (c2) based on the predetermined side of the print medium interpreted in step (a) and the side of the print medium detected by step (b).

17. The control method as set forth in claim 12, further comprising the steps of:

(g) sending to the host device a print medium side notification indicative of the side of the print medium detected by step (b); and (h) receiving from the host device print data corresponding the side of the print medium detected by step (b).

18. The control method as set forth in claim 12, further comprising the steps of:

(i) storing the print data for printing to a first side of the print medium; and (j) storing the print data for printing to a second side of the print medium;

wherein step (c) selects either one of the print data stored in step (i) and steps (j) for printing based on the side of the print medium detected by step (b).

19. The control method as set forth in claim 12, wherein print medium has a preprinted marking, and step (b) detects the side of the print medium by detecting the preprinted marking.

20. The control method as set forth in claim 19, the preprinted marking comprises at least either one of a magnetic ink character and bar code.

21. The control method as set forth in claim 12, further comprising the steps of:

(k) detecting a direction in which the print medium is inserted in the printer, and (l) rotating the print data based on the insertion direction detected by step (k).

22. The control method as set forth in claim 21, wherein the print medium has a cutoff at a predetermined corner thereof, wherein step (b) detects the side of the print medium by detecting the cutoff at the predetermined corner, and wherein step (k) detects the direction by detecting the cutoff at the predetermined corner.

23. A data medium for a computer executable program for controlling method for a printer that is in communication with a host device for printing on a print medium based on print data and a print command received from the host device, said control method comprising the steps of:

(a) interpreting the print command which indicates a predetermined side of the print medium side for printing;

(b) detecting a side of the print medium inserted in the printer which faces a predetermined direction; and (c) printing the print data when the predetermined side of the print medium side interpreted in step (a) and the side of the print medium detected by step (b) are the same.

24. The data medium as set forth in claim 23, wherein the control method further comprising the step of:

(d) ejecting the print medium when the predetermined side of the print medium side interpreted in step (a) and the side of the print medium detected by step (b) are different.

25. The data medium as set forth in claim 24, wherein step (c) further comprises the step of ejecting the print medium from a form ejection opening after printing in step (c) is completed, and wherein step (d) ejects the print medium from a form insertion opening.

26. The data medium as set forth in claim 23, wherein the control method further comprising the steps of:

(e) reversing the side of the print medium; and (f) printing the print data on the print medium after step (e) when the predetermined side of the print medium side interpreted in step (a) and the side of the print medium detected by step (b) are different.

27. The data medium as set forth in claim 23, wherein step (c) comprises the steps of:

(c1) printing print data on a first side of the print medium; and (c2) printing print data on a second side of the print medium; and (c3) selecting either one of step (c1) and step (c2) based on the predetermined side of the print medium interpreted in step (a) and the side of the print medium detected by step (b).

28. The data medium as set forth in claim 23, wherein the control method further comprising the steps of:

(g) sending to the host device a print medium side notification indicative of the side of the print medium detected by step (b); and (h) receiving from the host device print data corresponding the side of the print medium detected by step (b).

29. The data medium as set forth in claim 23, wherein the control method further comprising the steps of:

(i) storing the print data for printing to a first side of the print medium; and (j) storing the print data for printing to a second side of the print medium;

wherein step (c) selects either one of the print data stored in step (i) and step (j) for printing based on the side of the print medium detected by step (b).

30. The data medium as set forth in claim 23, wherein print medium has a preprinted marking, and step (b) detects the side of the print medium by detecting the preprinted marking.

31. The data storage medium as set forth in claim 30, wherein said marking comprises at least either one of a magnetic ink character and bar code.

32. The data medium as set forth in claim 30, wherein the control method further comprising the steps of:

(k) detecting a direction in which the print medium is inserted in the printer, and (l) rotating the print data based on the insertion direction detected by step (k).

33. The data medium as set forth in claim 23, wherein the print medium has a cutoff at a predetermined corner thereof, wherein step (b) detects the side of the print medium by detecting the cutoff at the predetermined corner, and wherein step (k) detects the direction by detecting the cutoff at the predetermined corner.

34. A printer in communication with a host device for printing on a print medium based on print data and a print command received from the host device, comprising:

print command interpreter means for interpreting the print command which indicates a predetermined side of the print medium to be printed on by said printer;

inserted side detecting means for detecting a side of the print medium inserted in said printer which faces a predetermined direction; and control means for controlling said printer to print the print data when the predetermined side interpreted by said print command interpreter means is the same as the side of the print medium detected by said inserted side detecting means which faces the predetermined direction.

35. The printer as set forth in claim 34, wherein said control means causes the print medium to be ejected from said printer when the predetermined side interpreted by said print command interpreter means is different from the side of the print medium detected by the inserted side detecting means which faces the predetermined direction.

36. The printer as set forth in claim 35, further comprising:

a form insertion opening to insert the print medium; and a form ejection opening to eject the print medium from said printer;

wherein said control means causes the print medium inserted in said insertion opening to be ejected from said form ejection opening after printing is completed when the predetermined side interpreted by said print command interpreter means is the same as the side of the print medium detected by the inserted side detecting means which faces the predetermined direction, and wherein said control means causes the print medium inserted in said insertion opening to be ejected from said form insertion opening when the predetermined side interpreted by said print command interpreter means is different from the side of the print medium detected by said inserted side detecting means which faces the predetermined direction.

37. The printer as set forth in claim 34, further comprising a form reversing means for reversing sides of an inserted print medium;

wherein when the predetermined side interpreted by said print command interpreter means and the side of the print medium detected by said inserted side detecting means are different, said form reversing means in response to said control means reverses a side of the print medium, and then said printer prints the print data on the print medium.

38. The printer as set forth in claim 34, further comprising:

first printing means for printing the print data on a first side of the print medium, and a second printing means for printing the print data on a second side of the print medium;

wherein said control means selects either one of said first and second printing means based on the predetermined side interpreted by said print command interpreter means and the side of the print medium detected by said inserted side detecting means.

39. The printer as set forth in claim 34, further comprising:

inserted form side notification means for sending to the host device a print medium side notification indicative of the side of the print medium side by said inserted side detecting means, and print data receiving means for receiving from the host device print data corresponding to the detected print medium side;

wherein said printer in response to said control means prints the print data received by said print data receiving means on the print medium.

40. The printer as set forth in claim 34, further comprising:

first storage means for storing print data for printing on a first side of the print medium, and second storage means for storing print data for printing on a second side of the print medium;

wherein said control means selects either one of said first and second storage means based on the side of the print medium detected by said inserted side detecting means and wherein said printer prints on the print medium with the print data from either one of said first and second storage means selected by said control means.

41. The printer as set forth in claim 34, wherein the print medium has a preprinted marking, and wherein said inserted side detecting means detects an inserted print medium side by detecting the preprinted marking.

42. The printer as set forth in claim 41, wherein the preprinted marking comprises at least either one of a magnetic ink character and bar code.

43. The printer as set forth in claim 34, further comprising:

insertion direction detecting means for detecting a direction in which the print medium is inserted in said printer, and a print data rotation processing means for rotating the print data based on the insertion direction detected by said insertion direction detecting means.

44. The printer as set forth in claim 43, wherein the print medium has a cutoff at a predetermined corner thereof, wherein said inserted side detecting means detects the side of the print medium by detecting the cutoff at the predetermined the corner, and wherein said insertion direction detecting means detects a direction of insertion of the print medium by detecting the cutoff at the predetermined the corner.

* * * * *